UNITED STATES PATENT OFFICE.

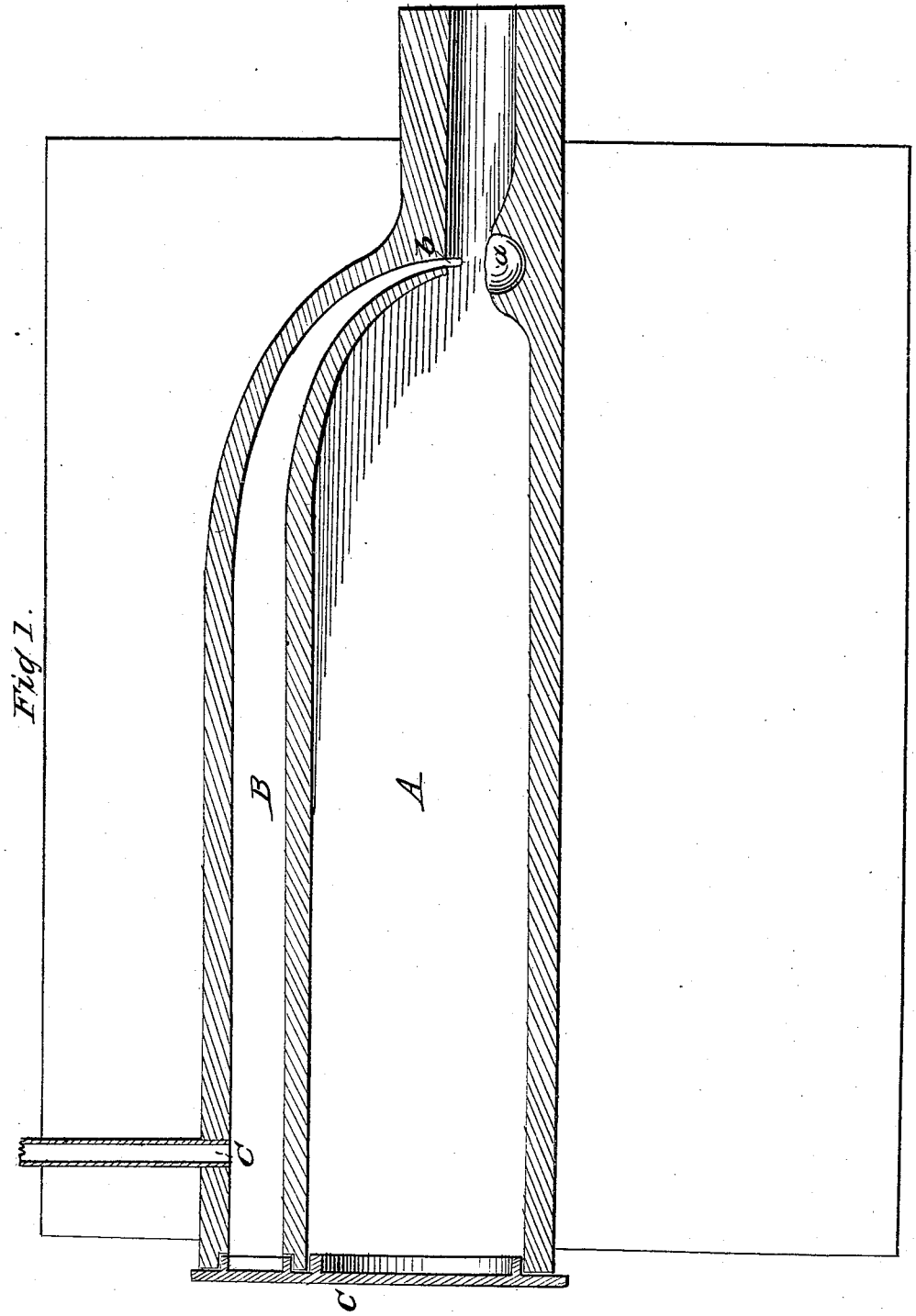

C. N. TYLER, OF WASHINGTON, DISTRICT OF COLUMBIA.

GAS-RETORT.

Specification of Letters Patent No. 20,671, dated June 22, 1858.

*To all whom it may concern:*

Be it known that I, CHARLES N. TYLER, of the city of Washington, in the District of Columbia, have invented a certain new and useful Improvement in the Construction of Gas-Retorts, of which the following is a full, clear, and exact description, reference being had to the accompanying drawing, making part of this specification, in which—

Figure 1, represents a vertical longitudinal section of a retort embracing my improvement.

My invention relates more particularly to that class of retorts intended for the generation and mixing of hydrogen gas with the heavy carbureted hydrogen gas evolved from the dry distillation of materials, such as wood, coal, rosin oil and other such articles, and it consists first, in so constructing the chamber in which the hydrogen is generated, and arranging and connecting it with the other retort in which the dry distillation takes place, that the hydrogen shall be brought in contact with the carbureted hydrogen gas, as it enters the passage that leads from the retort into the hydraulic main; at which point immediately beneath the outlet of hydrogen retort, the main retort is formed with a cavity, into which the heavy carbonaceous matter is precipitated by the force of the current of hydrogen from above; by this means the cavity being heated to the same degree as the retort the particles of carbon are again driven off in a fine state and in a condition more readily to combine with the hydrogen, and thus instead of forming a mere deposit of tar or other such products as under other circumstances would be the case, will be utilized by being transformed into olefiant gas.

Secondly, my invention consists in elongating the eduction end of the main retort so that the cavity into which the heavy carbonaceous matter is precipitated, may be situated within the direct action of the fire, that the requisite degree of heat may be communicated to it for the more effectual mixing of the hydrogen with the carbon.

To enable others skilled in the art to make, construct and use my invention I will now proceed to describe it in detail reference being had to the drawing, in which the main retort (A) in which the dry distillation is carried on, is represented as being formed in one piece with the small retort (B) for the generation of hydrogen gas. The main retort is represented as being flat on its under and circular on its upper side, the whole presenting the general appearance on looking at its end, of the segment of a circle; but it may be formed in any other way suitable for the purpose, so long as its outlet is constructed of a length and size sufficient to permit of the formation of a cavity (*a*) within the direct influence of the fire of the furnace. Immediately above this cavity is arranged the outlet (*b*) to the retort (B). In this retort at the other end is placed iron, coke or other suitable material for the generation of hydrogen gas, which is readily generated by allowing water to drop slowly from a vessel suitably arranged, through the tube (*c*) upon the iron or coke, which when heated to a red or cherry heat rapidly decomposes the steam produced, setting free the hydrogen of the water, which having no other outlet than the orifice (*b*) immediately above the cavity (*a*) (the other end of both retorts being tightly closed by a door or cap (C) ) is brought in contact with the carbonaceous gaseous products evolved from the dry distillation of the wood or other materials used for the purpose in the main retort, instantly precipitating by the force of its current, the heavier particles of carbon held in suspension, into the cavity (*a*) which being heated to the same degree as the retort greatly facilitates the mixture of the carbon with the hydrogen previous to their exit through the outlet of the retort into the hydraulic main.

By constructing the retort on this plan it has been found that a much greater quantity and a better quality of gas can be produced than when they are mixed in any other way.

Having thus described my invention what I claim as new and desire to secure by Letters Patent is—

1. The combination of the cavity (*a*) with the outlet (*b*) of the hydrogen retort in the manner and for the purpose substantially as set forth.

2. I claim elongating the end of the retort (A) so that the cavity (*a*) may be arranged on the inside of the furnace for the purposes set forth.

In testimony whereof, I hereunto set my hand to this specification.

C. N. TYLER.

Witnesses:
F. I. MURPHY,
W. LERKE.